United States Patent
Kurtz

[11] 3,937,555
[45] Feb. 10, 1976

[54] HOLOGRAPHIC MOTION PICTURE CAMERA WITH DOPPLER SHIFT COMPENSATION

[75] Inventor: Robert L. Kurtz, Huntsville, Ala.

[73] Assignee: The United States of America as represented by the Administrator of the National Aeronautics and Space Administration, Washington, D.C.

[22] Filed: Sept. 17, 1974

[21] Appl. No.: 506,804

[52] U.S. Cl. ................................. 350/3.5
[51] Int. Cl.² ................ G03H 1/14; G03H 1/04
[58] Field of Search ........ 350/3.5; 356/28, 106, 109

[56] References Cited
UNITED STATES PATENTS

| | | | |
|---|---|---|---|
| 3,267,284 | 8/1966 | Mackta | 350/162 R |
| 3,511,569 | 5/1970 | Mackta | 350/3.5 |
| 3,572,882 | 3/1971 | Neumann | 350/3.5 |
| 3,606,519 | 9/1971 | Kurtz | 350/3.5 |
| 3,661,437 | 5/1972 | Mottier | 350/3.5 |
| 3,752,556 | 8/1973 | Kurtz | 350/3.5 |

OTHER PUBLICATIONS

Huffaker, Applied Optics, Vol. 9, No. 5, May 1970, pp. 1026–1027.

*Primary Examiner*—Ronald J. Stern
*Attorney, Agent, or Firm*—George J. Porter; L. D. Wofford, Jr.; John R. Manning

[57] ABSTRACT

A holographic motion picture camera for producing three dimensional images employing an elliptical optical system and where there is provided in one of the beam paths (the object or reference beam path) a motion compensator which enables the camera to photograph faster moving objects.

2 Claims, 3 Drawing Figures

HOLOGRAPHIC MOTION PICTURE CAMERA WITH DOPPLER SHIFT COMPENSATION

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to holography, and more particularly to an improved apparatus for producing holographic motion pictures.

2. Description of the Prior Art

Since the resurgency of holography in 1962, there has been the desire to devise a holographic motion picture camera which would produce true three-dimensional images of a moving target in real time with resolution of front surface details. Such would also allow single-exposure holograms of fast-moving objects and transient events. The primary drawback to the development of such a device has been the very nature of the holographic process itself. The two beams necessary to record a hologram (the object and reference beams, respectively) must stay in phase one with respect to the other by less than a half wave length of the radiation being used to record the hologram. In illuminating the front of an object which is moving during a holographic exposure, it is thus necessary that the phase shift in the object beam during this exposure be kept within this limit. This is true since phase of the radiation is a constant times the magnitude of the change in the object beam path length. Consequently, if the object moves during the exposure, then the phase of the object beam changes by a constant times the magnitude of the change in the object beam path length, due to the object's total motion or displacement during exposure.

In a previous patent application (now U.S. Pat. No. 3,752,556), the applicant disclosed a holographic motion picture camera which has successfully obtained three-dimensional motion pictures. Its success is due primarily to the use of a unique elliptical holographic arrangement which partially relaxes or decouples the motion or displacement of the object from the phase change in the optical path length of the object beam. It accomplishes this through the constancy properties of the ellipse. This device does, however, have limitations because of the allowable magnitude of total motion of the object during the hologram exposure.

It is the purpose of this invention to further relax, decouple, or compensate for the motion or displacement of the object from the phase change of the optical path length of the object beam, and thus to enable the camera to record images of objects moving at greater speeds, i.e., or over longer distances during exposure.

SUMMARY OF THE INVENTION

In accordance with the invention, a beam length compensator is included in either the object beam path or reference beam path, or in both. In one form of the invention, this compensator is a rotating mirror. In a second form of the invention, there is provided a pair of fixed mirrors placed in the object beam path, one mirror being on each side of the minor elliptical axis of the system so that the object beam is projected from a first mirror onto the object, back to a second mirror, then from the second mirror back to the object, and thence onto the film. Thus, in this case, there are in effect two paths onto the object and where, due to motion, one path between one of the mirrors and the object may decrease due to the motion, the other path will increase and thereby compensate for the motion that occurs during an exposure.

DETAILED DESCRIPTION OF THE DRAWINGS

Figure 1:
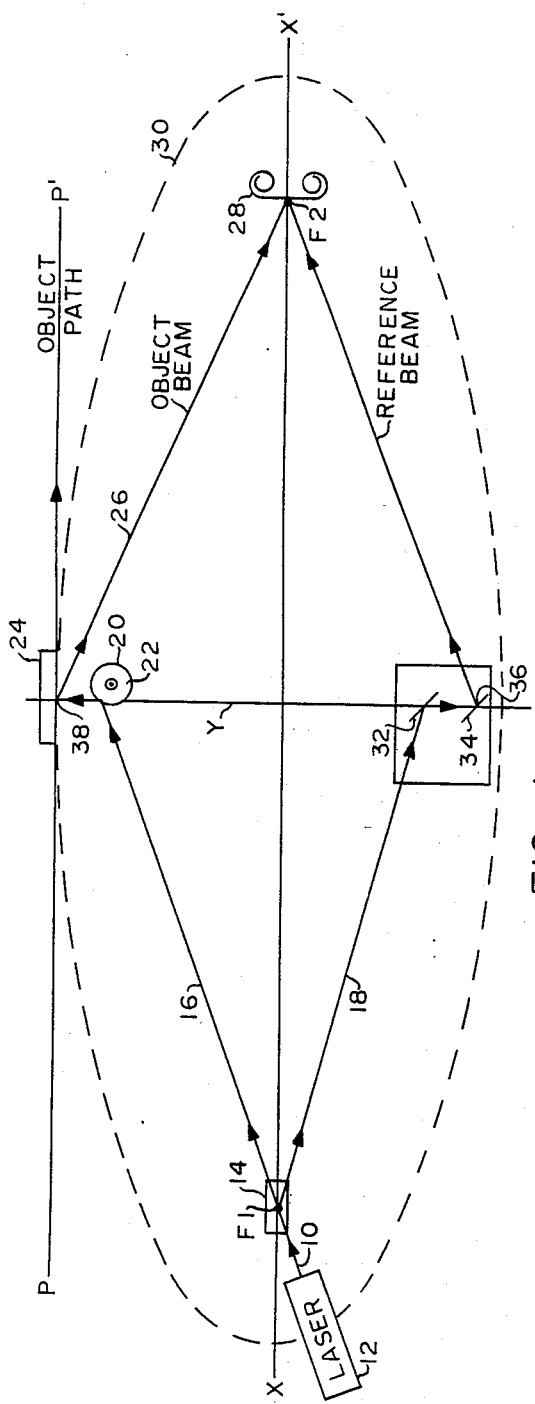
FIG. 1 is a schematic diagram illustrative of an embodiment of the invention.

Referring to FIG. 1, there is shown a holographic motion picture camera employing an elliptical optical system wherein the major axis X–X' of the ellipse is parallel to the line of motion P–P' of a moving projectile or other moving object to be holographed, line P–P' being tangent to the ellipse. Radiation beam 10 from laser 12 is directed onto beam splitter 14 centered at focus F1, which divides the beam into object beam 16 and reference beam 18. The object beam is directed onto motion compensator 20. Motion compensator 20 is a highly-polished outer surface of rotatable cylinder 22 and is positioned to reflect the received beam 16 onto the surface of moving object 24. From object 24 beam 16 is reflected along path 26 onto film 28 centered at focus F2 of ellipse 30. Reference beam 18 from beam splitter 14 is elongated by means of the additional optical path length provided by mirrors 32 and 34. It functions to equalize the added path length effected by the insertion of motion compensator 20 and thereby to make them statically equal. From mirror 32 reference beam 18 projects onto mirror 34 positioned at the intersection of minor axis Y of ellipse 30 at point 36, and the beam is then directed onto film 28 where it interacts with object beam 16 to record a holographic image.

As illustrated, object 24 is a moving object, moving along line P–P' which is parallel to major axis X–X' of ellipse 30 and is tangent to ellipse 30 at point 38, which lies on the perpendicular bisector of major axis X–X' or minor axis Y of the ellipse. While the elliptical configuration itself provides substantial compensation for object motion, there is the limitation that at certain high magnitude of object motion the elliptical arrangement is not sufficient to prevent critical shift in the observed wave length of the light beam which illuminates the object. The present invention provides additional compensation which in many instances eliminates practical effect of such limitation.

Turning briefly to the concept which gave rise to the present invention, we discuss the doppler effect for light waves. It is to be noted that if a source of light waves and a receiver are in motion relative to each other, the observed frequency (i.e., wave length) is changed or shifted slightly compared with that received when there is no motion.

The relativistic expression for the doppler shift of light caused by the presence of this relative motion between source and observer for light is $$V' = V\left[1 - \frac{U}{C} + \frac{1}{2}\frac{U}{C}^2 + \cdots\right]$$

where V is velocity and U is the relative velocity between the source and receiver. If the source and receiver are approaching each other, we must replace U by −U.

Consider a source S having some frequency $V_S$ and a wave length $\lambda_S$ and receiver R having some frequency $V_R$ and wave length $X_R$ approaching each other and thus related by $$V = \frac{C}{\lambda}$$

where C is the constant velocity of light, and

```
 S    R              V_R > V_S
 .    .       then
 V_S  V_R            λ_R < λ_S
      ←
```

Conversely, consider the case where source S and receiver R move away from each other, and

```
 S    R              V_R < V_S
 .    .       then
 V_S  V_R            λ_R > λ_S
      →
```

Therefore, the source moving towards the receiver causes the frequency to shift up or what is the same; causes the wave length to shift down slightly. Conversely, the source moving away from the receiver causes the frequency to shift down or what is the same, causes the wave length to shift up slightly.

The function performed by motion compensator 20 is as follows. Suppose the desired velocity of moving object 24 is known. Then motion compensator 20 is rotated at an angular rate and in a direction such that its tangential velocity is precisely equal and opposite to the velocity of moving object 24. Then the radiation from beam splitter 14, when incident on motion compensator 20, will shift frequency $f$ up to a new frequency $f1$. This new frequency $f1$, when incident on moving object 24, having an equal but oppositely-directed velocity, will be shifted down from $f1$ to the original frequency $f$. Therefore, when the radiation of object beam 16 combines with the radiation of reference beam 18 at the film at position F2, there will be no relative phase shift between them, and consequently, the effect of the motion of object 24 will have been nulled. Thus, object 24 may move as much as desired during the exposure of a hologram, provided the same motion in the opposite direction is induced by virtue of motion compensator 20, used in conjunction with the elliptical holographic arrangement. The elliptical arrangement is necessary to alleviate any possible mismatch between the motion of the object and the motion of the compensator.

Figure 2:
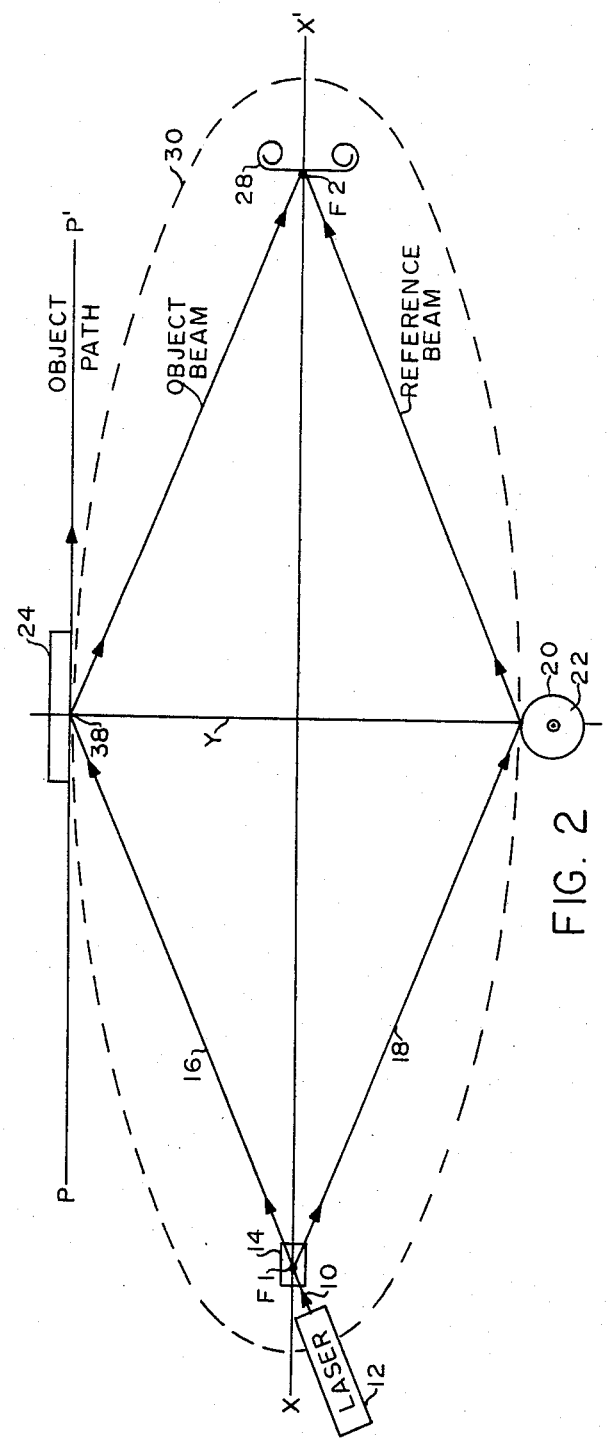
FIG. 2 is a schematic diagram of an alternate version of the embodiment of FIG. 1.

An alternate embodiment of the invention is shown in FIG. 2. Here the frequency of object beam 16 is shifted down from $f$ to $f1$ by the motion of the object. Compensation is provided by allowing the reference beam to be also downshifted from $f$ to $f1$ by being incident on reflective motion compensator 20. Motion compensator 20 has its displacement in the same direction as the moving target. This version does not require supplemental mirrors for equalizing the path length. Operation is otherwise the same as that for the embodiment of the invention shown in FIG. 1.

Figure 3:
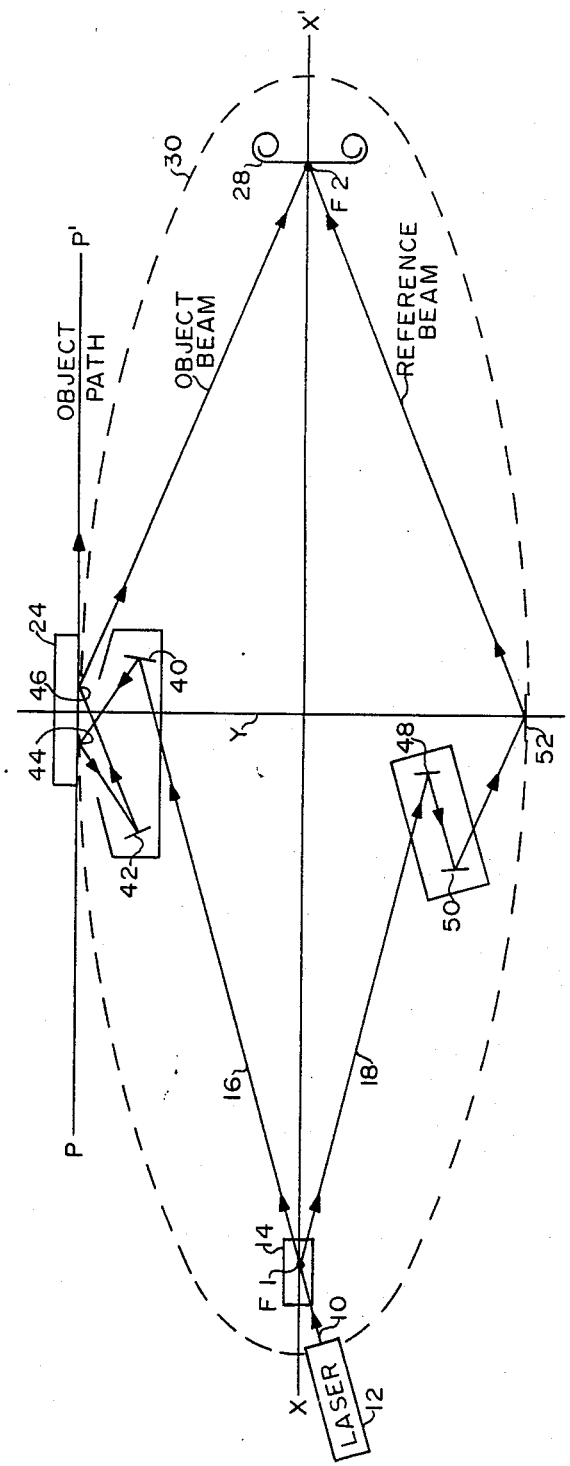
FIG. 3 is a schematic diagram of another embodiment of the invention, using mirrors in the object beam path.

A third embodiment of the invention is shown in FIG. 3. Here the principle is basically the same, but the spinning disc or cylinder to shift the frequency up is supplanted by a pair of unequally spaced mirrors (from minor axis Y), mirror 40 being positioned on one side of minor axis Y, and mirror 42 positioned on the other side of minor axis Y at a greater distance than mirror 40. The object beam is first directed to mirror 40, which is oriented to reflect the beam onto a trailing portion of object 24 at point 44. From point 44 it is reflected onto mirror 42, and from mirror 42 it is reflected onto point 46 of a leading portion of object 24. From point 46 it reflects onto film 28.

Reference beam 18 from beam splitter 14 is elongated by means of an additional optical path length provided by mirrors 48, 50, and 52, which intercept the reference beam as shown. This added path length functions to equalize the added path length effected by the insertion of mirrors 40 and 42 within the path of object beam 16.

The direction of moving target 24 first shifts the frequency up from $f$ to $f1$ at point 44 on the object, then after being returned to the object by mirror 42, frequency $f1$ is downshifted to $f$ at point 46. Consequently, when the object and reference beams combine on film 28 at focus point F2, there is no relative phase shift between the beams and a high contrast hologram of the object is recorded. This embodiment offers the advantage that it is not necessary to know the object's velocity before the fact. However, this is accomplished at some expense of loss of control over the beam's cross-section because of scattering effects.

Having thus described the invention, what is claimed is:

1. In a holographic motion picture camera wherein: an elliptical optical system is employed to provide an object beam passing from a beam splitter at one focus point onto an object moving tangent to an ellipse and parallel to the major axis of the ellipse; the object beam is then reflected from the object onto a film positioned at the other focus point; a reference beam is projected from a beam splitter to a mirror positioned on the ellipse opposite the object, and then it is reflected onto the film, the improvement comprising:

motion compensation means for varying the path length of said object beam as a function of the speed of said object comprising a rotating reflective drum inserted in the object beam path between said beam splitter and an object, and optical means positioned in the reference beam path between said beam splitter and said film for extending the optical distance of the reference beam path a distance equal to the extension of distance provided by said motion compensation means.

2. In a holographic motion picture camera wherein: an elliptical optical system is employed to provide an object beam passing from a beam splitter at one focus point onto an object moving tangent to an ellipse and parallel to the major axis of the ellipse; the object beam is then reflected from the object onto a film positioned at the other focus point; a reference beam is projected from a beam splitter to a mirror, and then it is reflected onto the film, the improvement comprising:

motion compensation means in turn comprising a pair of compensation mirrors positioned in said object beam path between said beam splitter and an object, one of said compensation mirrors being positioned on one side of the minor axis of said ellipse and being oriented to reflect the object beam across the minor axis on a trailing portion of the object, and the other of said compensation mirrors being positioned on the other side of said minor axis and oriented to receive a reflected image from said object and reflect it back across the minor axis onto a leading portion of said object from which it is reflected onto said film, and means in said reference beam for equalizing the optical path length of the reference beam with the optical path length of the object beam.

* * * * *